United States Patent [19]

Dwyer et al.

[11] Patent Number: 4,809,116
[45] Date of Patent: Feb. 28, 1989

[54] MODULAR DICTATION/TRANSCRIPTION SYSTEM HAVING PLURAL RECORDING MODULES AND A COMMON DISPLAY

[75] Inventors: John J. Dwyer, Stratford; David B. Chamberlin, Milford, both of Conn.

[73] Assignee: Dictaphone Corporation, Stratford, Conn.

[21] Appl. No.: 894,583

[22] Filed: Aug. 8, 1986

[51] Int. Cl.[4] .................... G11B 15/18; G11B 17/00
[52] U.S. Cl. ................................ 360/137; 360/69; 360/72.2
[58] Field of Search ............ 360/69, 71, 72.1, 72.2, 360/72.3, 74.4, 92, 137; 369/25, 27–29; 379/75; 340/252–254

[56] References Cited

U.S. PATENT DOCUMENTS

| | | | |
|---|---|---|---|
| 4,130,849 | 12/1978 | Freehauf | 360/137 |
| 4,200,893 | 4/1980 | Matison | 360/72.1 |
| 4,221,938 | 9/1980 | Mohammadioun et al. | 379/75 X |
| 4,319,290 | 3/1982 | Bolick et al. | 360/92 |
| 4,352,173 | 9/1982 | Titus et al. | 369/27 |
| 4,623,988 | 11/1986 | Paulson et al. | 369/29 X |

FOREIGN PATENT DOCUMENTS

| | | | |
|---|---|---|---|
| 55-52573 | 4/1980 | Japan | 360/72.2 |
| 55-77067 | 6/1980 | Japan | 360/72.1 |

Primary Examiner—John H. Wolff
Attorney, Agent, or Firm—Robert H. Whisker; Melvin J. Scolnick; David E. Pitchenik

[57] ABSTRACT

A dictation transcription system having two or more recording/playback modules and a display module, all of which are detachably connectable to form an integral structure. The display module provides a visual display of the length, locations and types of messages recorded on either recording/playback module by storing and utilizing display data derived from either active module. This display data is generated and displayed during a dictate operation. When one recording/playback module is disposed in an inactive mode, its display data is stored and the display data derived from the other module if active, now is displayed.

30 Claims, 8 Drawing Sheets

MODULAR DICTATION/TRANSCRIPTION SYSTEM HAVING PLURAL RECORDING MODULES AND A COMMON DISPLAY

BACKGROUND OF THE INVENTION

This invention relates to dictation/transcription systems for the recording and retrieval of audio signals such as voice signals and, more particularly, to a display module adapted to be electrically and physically connected to one of two recording/playback modules which are themselves electrically interconnected so as to display information relating to the usage of each of those recording/playback modules.

A variety of display devices for dictation/transcription equipment is presently available, such as lamps, LED's, liquid crystal displays and the like. By way of example of display devices for dictation/transcription equipment which have been proposed, the following U.S. Pat. Nos. are of interest.

Matison (U.S. Pat. No. 4,200,893) discloses the display of locations of information recorded on a tape recording medium, and a counting of revolutions of a reel of a tape transport to determine position of the recording tape.

Sander et al (U.S. Pat. No. 4,319,337) disclose the storage and display of information relating to the length and identity of recorded messages in a system employing multiple dictation stations.

Titus et al (U.S. Pat. No. 4,398,279) disclose a numerical readout of dictation segments and time available for dictation on a recording medium.

Titus et al (U.S. Pat. No. 4,399,527) disclose the use of registers for storing information as to the location of messages recorded on a recording medium, and the presentation of such information by numerical and graphical displays.

Dictation/transcription equipment may be employed in a business office for dictation of memoranda, letters, and other such materials which are later played back for transcription to a typewritten document. Typically, dictation is recorded on cassettes of magnetic recording tape; and a given cassette may store several items of dictation of different types, of differing length, by different authors, and having different priorities of transcription.

Heretofore, detailed information about the location of a dictated item on the recording tape, the length of that item, its author, the priority in which each item should be transcribed, and other such relevant dictation/transcription information has not been available readily to the transcriptionist. It would be advantageous if such information is recorded for display. While display devices have been integrated into dictating machines, such devices increase the overall cost of those machines. Often, many dictation/recording/review operations can be carried out without the benefits offered by display devices. Also, many users may have a need for two dictating machines (e.g., one for recording dictation and the other for recording telephone messages, or one used as a primary recorder and the other used for secondary recording, etc.) but such need can be satisfied with a single display device. In the dictating machine marketed by the Dictaphone Corporation under the trademark DCX DICTAMATION dictation machine, a particular display can be held, or "frozen" when a substitute recording medium is used, thereby preventing interference in the display due to the dictation of different messages on the substitute medium. Unfortunately, the user, or author, is not provided with any display indications relating to the messages, activity or usage of his machine relating to the substitute medium.

SUMMARY OF THE INVENTION

The foregoing problems are overcome and other advantages are attained in a dictation/transcription system of the present invention which is adapted to be used with a plurality of recording/playback devices, or modules, and which includes a display module that displays information relating to recorded dictation in the respective recording/playback modules. The displayed information indicates the location of a recorded message, the length of that message, identification of the author, time, date, etc., for each of two interconnected recording/playback modules.

The display presents a graphical portrayal of the locations of recorded messages by means of, for example, three separate bar graphs, one preferably formed of one or more segments of visual indicators which, when energized, displays representations of the length of each of the messages. The segments representing the length of a message are grouped in a "block", and the positions of the blocks represent the relative positions of the recorded messages. Also displayed (preferably by flashing of the segment blocks) are representations of the type or nature of a message, such as a "letter", "priority letter", or the like. One of the bar graphs preferably displays a cursor which represents the present position on the recording medium. Yet another bar graph represents the locations of "instructions" and "notes". Flashing of segments indicates "priority" and "special" notations. Further data, such as author identification, length of a recording tape, time, and date are presented by alphanumeric symbols.

In accordance with the invention, the display device may be formed integrally with one of two interconnected recording/playback devices, or may be adapted to operate in a modular system as a separate module which can easily be connected to and disconnected from the interconnected recording/playback modules.

Preferably, both the display device and each of the recording/playback device are provided with microprocessors and a communication link which couples command signals and control information signals between the modules, thereby enabling the modules to cooperate in performing various system functions relating to the recording and retrieval of messages, and the display of in formation.

One aspect of the invention is the recording of useful non-message data on the recording medium by storing a complete history of usage (e.g., message type, location, length, author, etc.) on the medium along with recorded dictation. When a recording tape such as a tape cassette is used, the recorded cassette takes on the attributes of an "intelligent" cassette.

In a specific preferred embodiment, two recording/playback modules are electrically and physically interconnected to form an integral structure. The display module of the present invention need be coupled to only one of those recording/playback modules and operates to display information relating to messages recorded on the particular recording/playback module then in use, whichever one that may be. When the other recording/playback module is put in use, the displayed information changes over and indicates usage of that other module. Nevertheless, the display module stores display data derived from both recording/playback modules.

BRIEF DESCRIPTION OF THE DRAWING

The following description, taken by way of example, is best understood conjunction with the accompanying drawings wherein.

DETAILED DESCRIPTION

Figure 1:
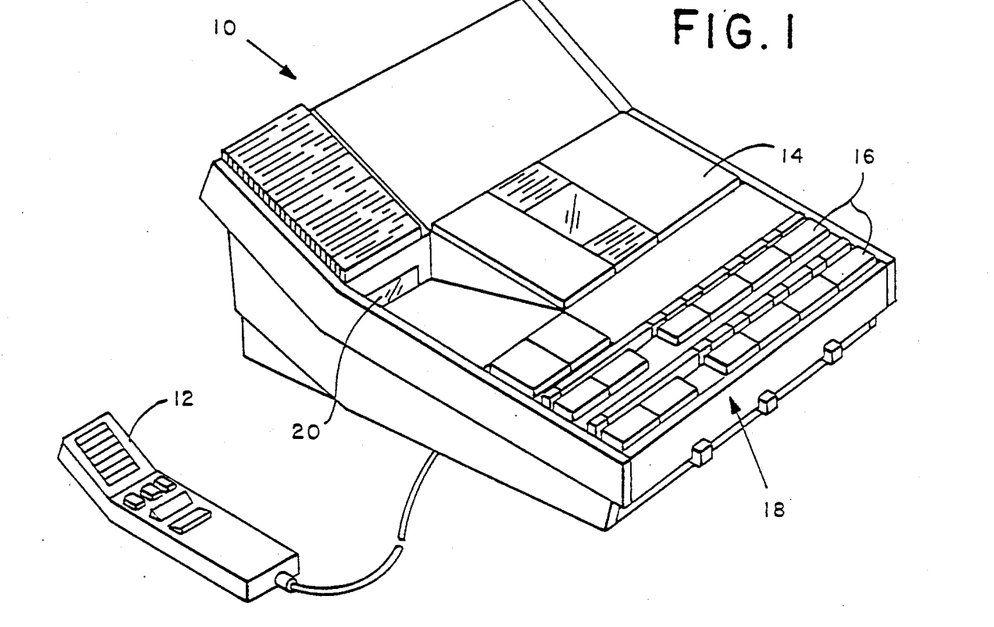
FIG. 1 shows a stylized view of a recording/playback device adapted for interconnection with a modular display unit in accordance with the present invention.
Figure 2:
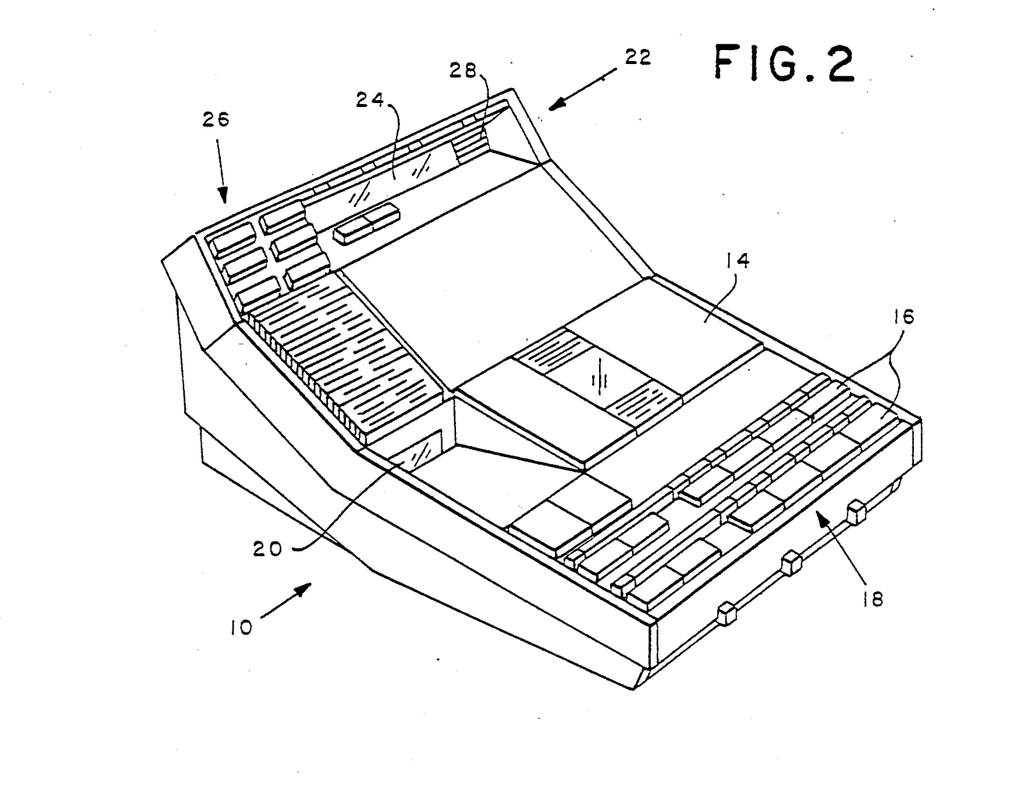
FIG. 2 shows the modular display unit of the present invention coupled to a dictation/transcription device comprising the device of FIG. 1 with a display module connected thereto for providing additional functions useful for dictation and transcription.
Figure 3:
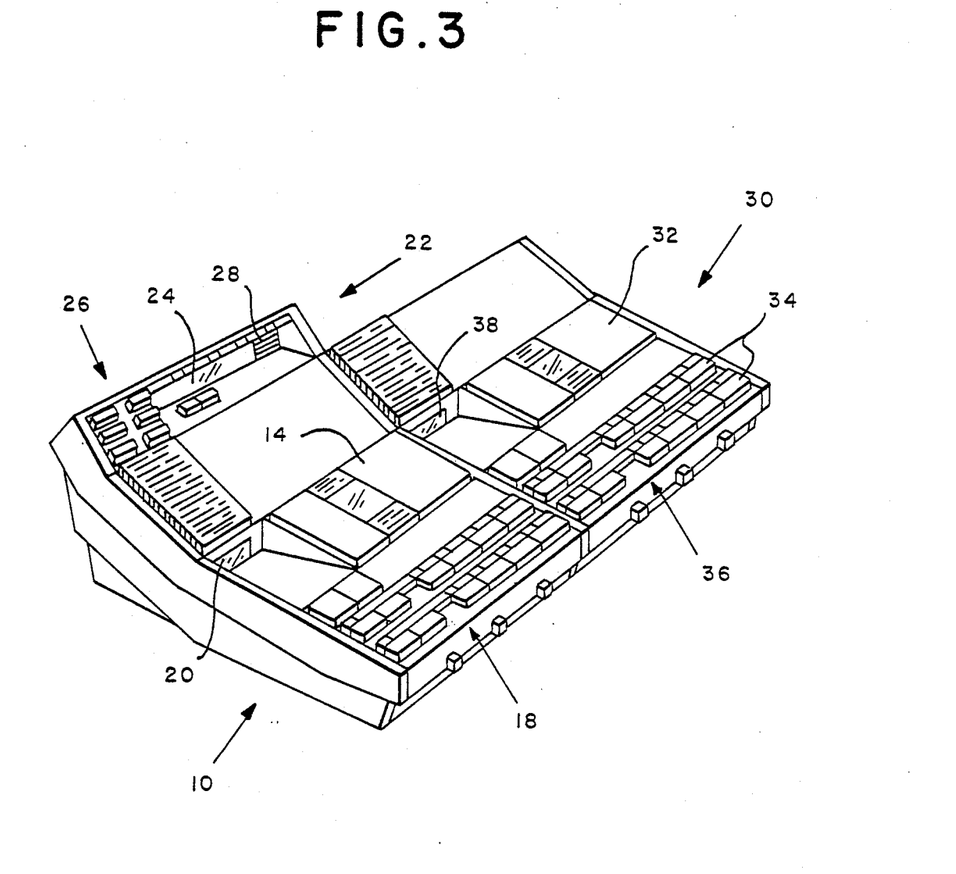
FIG. 3 shows the modular display unit of the present invention coupled to two recording/playback devices.

With reference to FIGS. 1, 2 and 3, there are shown, respectively, a recording/playback device 10, the recording/playback device electrically connected to a display device 22 incorporating the present invention, and two recording/playback devices 10 and 30 electrically connected to each other and to display device 22. These devices are more fully described in copending application Ser. No. 895,006, filed : Aug. 8, 1986, Titled: MODULAR DICTATION/TRANSCRIPTION SYSTEM (DIC-527) and assigned to the assignee of the present invention, the disclosure thereof being incorporated herein by reference. The display device and the recording/playback device of FIG. 2 may be combined in a single unitary construction, or may be constructed in modular form in which the recording/playback device nd the display device may be connected to each other, and disconnected from each other, as may be desired to provide for a display of recording-playback functions. In the present invention, a single display device is connected to a plurality (e.g., two) of recording/playback devices as depicted in FIG. 3. By way of example, the following description is directed to a modular form of a dictation/transcription system, it being understood that the present invention is equally applicable to a unitary construction of the recording/playback device and the display device.

The recording/playback device is shown in FIG. 1 as a module 10 which is operable as a stand-alone unit for the recording and playback of sound, particularly voice. A microphone 12 is shown connected to the module 10 for use by personnel to record a spoken message on a recording medium such as magnetic tape within a cassette (not shown in FIG. 1) located within a compartment 14. Push buttons 16 of a keyboard 18 are operably connected with a tape transport (not shown in FIG. 1) for advancement and rewind of the tape. The module 10 includes a display 20 which, for example, provides a numerical read-out of present position of the tape.

FIG. 2 shows a display module 22 which may be connected to the recording/playback module 10 to present additional information relating to dictation and transcription functions. For example, the display module 22 presents a plurality (preferably three) of bar graph displays composed of individual segments of visual indicators such as LED's, LCD's or the like which appear as display 24. Preferably, the display 24 is constructed as a liquid crystal display (LCD), with the aforementioned segments appearing as dark segments on a light background though, if desired, the display may present the segments as lighted segments on a dark background.

Successive segments form blocks which have lengths proportional to recorded messages such as letters, memos, and reports. The segments in a block may be made to flash to indicate a "priority" item which is to be typed immediately by a transcriptionist. Additional useful information is presented in alphanumeric form in a region 28 on the right side of the display 24, such as the identification of the author who dictated a message and the length (in minutes) of the message. The date and time of message is displayed in the display 20 of module 10.

In FIG. 3, the same dictation/transcription equipment 10 and 22 of FIG. 2 additionally is connected to an additional recording/playback module 30. Module 30 may be similar, or even substantially identical to, module 10 of FIG. 1, and includes a compartment 32 to receive a magnetic tape cassette (not shown in FIG. 3), or other recording medium. Compartment 32 may be of the same size as, or of a different size than the compartment 14 of the module 10; and, thus, cassettes of different sizes (such as standard, mini, micro or pico) may be accommodated by either module. Pushbuttons 34 of a keyboard 36 are operably connected with the tape transport for advancement and rewind of tape within module 30. A display 38 presents, for example, a numerical read-out of present position of tape. The circuitry of recording/playback module 10 and display module 22 are interconnected by suitable conductors.

As noted above, the invention relates particularly to the use of one display module 22 with a plurality of recording/playback modules, preferably, two modules 10 and 30 (FIG. 3). Display 22 thus displays information relating to the usage and activity of recording/playback module 10 as well as module 30, as will be described.

To facilitate an understanding of the present invention, reference first is made to FIGS. 4-7 which illustrate how display data and audio messages are recorded on the record medium of, for example, recording/playback module 10. It will be recognized that these figures are quite similar to the drawings of U.S. application Ser. No. 849,993, filedL Aug. 8, 1986 and titled: DISPLAY FOR MODULAR DICTATION/TRANSCRIPTION SYSTEM (DIC-526), assigned to the assignee of the present invention.

Figure 4:
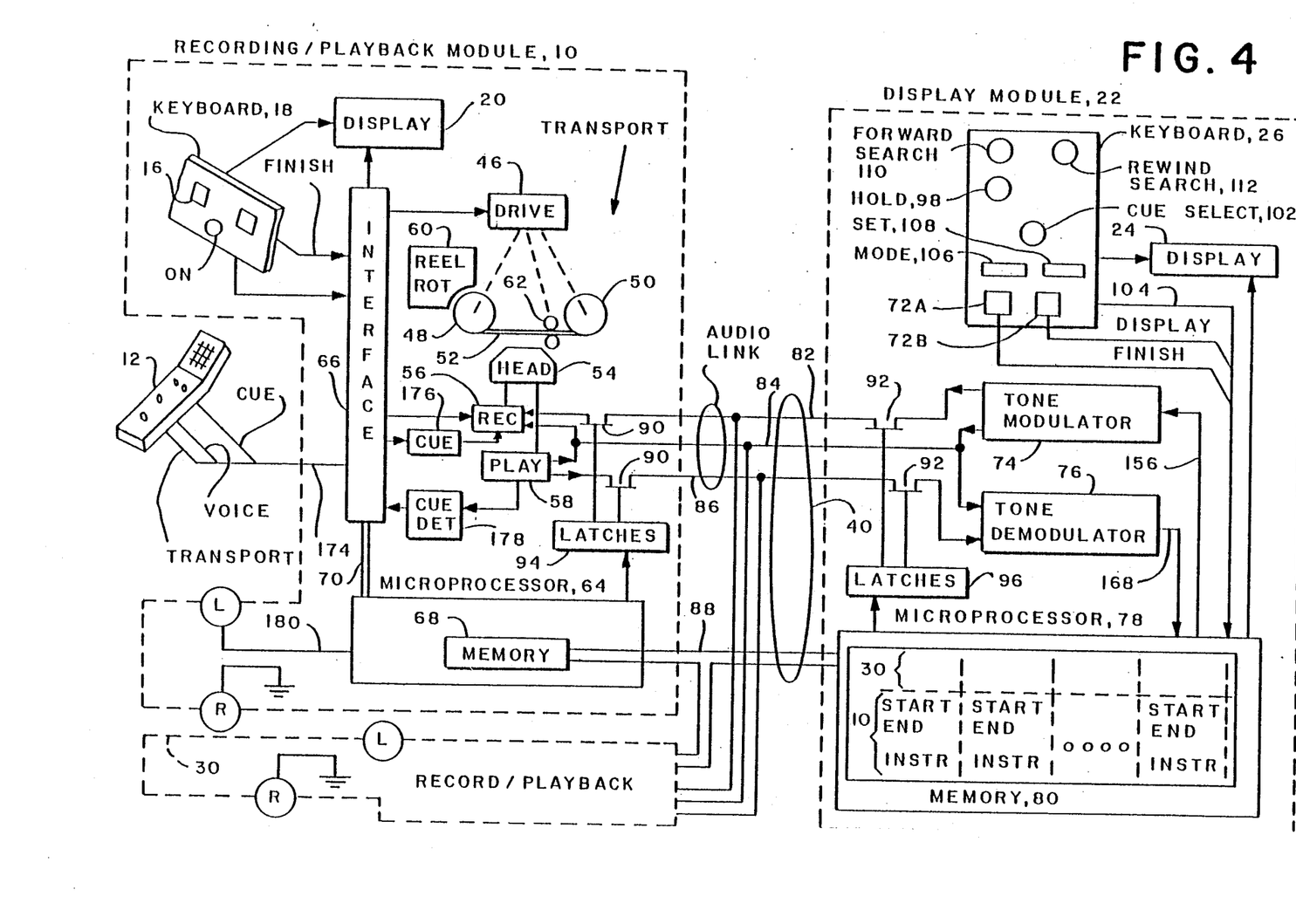
FIG. 4 is an electrical block diagram of the modular interconnected system of FIG. 3.

FIG. 4 is a block diagram of electrical circuitry of three modules 10, 22 and 30. Modules 10 and 30 both are recording/playback modules of substantially similar construction, and in the interest of simplification, only module 10 is shown in detail. It will be recognized that the interconnection and interaction of module 30 with module 22 is substantially the same as that of module 10. Display module 22, which is coupled to both of modules 10 and 30 by a conductor 40, is adapted to display information relating to whichever one of the recording/playback modules then is in an "active" mode of operation. The recording/playback module 10 comprises a drive 46 for rotating a supply reel 48 and a take-up reel 50 to transport a magnetic recording tape 52 past a recording/playback head 54 for the storing and retrieval of audio and display data signals on the tape. The module 10 further comprises a recording circuit 56 and a playback circuit 58 which connect with the head 54, and a rotation detector 60 which is positioned alongside the supply reel 48, for example, for detecting rotation thereof. A capstan 62 is operated by the drive 46 for maintaining a constant speed of travel of the tape 52 during record and playback operation. As the tape 52 unwinds from the supply reel 48, the effective diameter of the supply reel 48 becomes smaller causing its rotational speed to increase in view of the constant linear speed of the tape 52 driven by the capstan 62. Therefore, the detector 60 detects a continuously increasing rate of rotation during forward motion of the tape 52.

As shown in FIG. 4, the connection of the microphone 12 to the module 10 is accomplished via the interface unit 66, the connection being shown as a set of lines including a line for the cue signal, a line for voice communication, and a line for signals controlling transport motion such as forward, fast-forward and fast-rewind. The voice line from the microphone 12 is understood to include conductors for transmission of signals from the microphone to the recording circuit 56 and for playback of signals from the playback circuit 58 via a small speaker (not shown) within the microphone 12. The cue signal line activates an oscillator 176 to generate the cue signal which is supplied via the recording circuit 56 to the head 54.

The recording/playback module 10 also includes a microprocessor 64, which applies control signals via an interface unit 66 to the display 20, the drive 46, the recording circuit 56 and the playback circuit 58. Rotation signals in the form of motion pulses are produced by the rotation detector 60, and are coupled via the interface unit 66 to the microprocessor 64. A memory 68 coupled to the microprocessor 64 stores program data and other information useful in the operation of the microprocessor 64.

Digital signals are coupled between the interface unit 66 and the microprocessor 64 by a data bus 70. The interface unit also supplies signals from the keyboard 18 (partially shown in FIG. 4) to the microprocessor which, in turn, controls display 20 and selects the operational functions of the module 10.

A "finish" pushbutton 72A on keyboard 26 of display module 22 provides a signal indicating that an author has finished his dictation. This signal initiates an operation in the modules 10 and 22 (or modules 30 and 22 if module 30 is active and module 10 is inactive) by which a complete history of the types of recorded messages, their locations, the times and dates of recording and their author(s) are recorded on the tape 52 as a digitally formatted message placed alongside the audio information, or dictation, that also is recorded on the tape. Another pushbutton 72B on keyboard 26 of the display module 22 may be activated by an operator to command the display module 22 to display this recorded history on the display 24, preferably in bar graph form as mentioned above.

In a preferred embodiment of the invention, the presentation on the display 24 develops as the author dictates into the microphone 12 and tape 52 advances. One segment of the bar graph display is energized by way of example, for each 30-second interval of dictation. A graph length of ten segments would indicate, in the foregoing example, a dictation time of five minutes. The author indicates the end of a dictated passage, memo or report by pressing a cue button on the microphone 12. This end-of-dictation is represented by the omission of a segment (i.e., the segment is not energized) and the properly de-energized segment is determined as a function of the number of motion pulses that have been generated by rotation detector 60 of the recording/playback module 10. (It is appreciated that a similar rotation detector is included in module 30.) Pressing the cue button also activates the modules 10 and 22 to store the end of dictation point of the dictated material on the recording tape 52, as well as the author's identification, point of initial dictation on the recording tape, time and date of dictation of that particular message. This display data for all messages recorded on module 10 is recorded on the recording tape 52 in the form of a summary block of data in response to the operation of "finish" button 72A. Likewise, display data for messages recorded on module 30 is recorded on the tape used in that module. At a later time, after a power failure, for example, when modules 10 and 22 are subsequently reactivated, or if the tape is transferred to another similar system, the display module 22 can regenerate the graphical display from the display data stored on the recording tape upon command from the pushbutton 72B.

By way of example, the display data that is transferred between modules 10 (30) and 22 is in the form of a sequence of audio tone signals. In order to produce and recover these tone signals, the display module 22 includes a tone modulator 74, a tone demodulator 76 and a microprocessor 78, in addition to the aforementioned display 24 and a keyboard 26. The microprocessor 78, which may be an NEC Model 7500 or similar device, includes a memory 80 for storing program data and the aforementioned display data.

A connector 40 interconnects the two modules 10, 30 and 22 and comprises an audio link composed of lines 82, 84 and 86, and a digital data bus 88. The bus 88 couples digitally formatted signals between the two microprocessors 64 and 78 and also between microprocessor 78 and the microprocessor included in module 30. The line 82 couples audio signals from the tone modulator 74 either to the recording circuit 56 or to the recording circuit of module 30. The line 86 couples audio signals either from the playback circuit 58 or the playback circuit of module 30 to the tone demodulator 76. The line 84 is a return line for the signals on both lines 82 and 86. Analog switches 90 in the form of field effect transistors (FET's) in the recording/playback module 10, and analog switches 92 in the form of FET's in the display module 22 permit either of the modules 10 and 22 to be connected and disconnected from the audio lines 82 and 84. Similar FET switches are provided in module 30. The switches 90 are operated by the microprocessor 64 via latches 94. The switches 92 are operated by the microprocessor 78 via latches 96.

Since the audio link enables the connection of the audio lines of the display module 22 to recording/playback module 30 to permit display module 22 to function with two recording/playback modules, the memory 80 of the display module 22 stores display data supplied from both recording/playback modules. Memory 80 may be divided into separate sections, each storing display data from a respective recording/playback module.

Keyboard 26 of the display module 22 includes the aforementioned FINISH and DISPLAY buttons 72A and 72B, a hold button 98, a cue select button 102, a FORWARD SEARCH button 110 and a REWIND SEARCH button 112. These buttons are electrically connected via line 104 to the microprocessor 78 for selecting operating functions of the microprocessor. The hold button 98 is useful in retaining a presentation on the display 24. The cue select button 102 is useful during transcription because it allows an operator to select a type of message to be accessed such as a letter, a "priority" letter, an instruction or a "special" note. Recorded messages are characterized as one of the foregoing types by operating the cue buttons on microphone 12, and a specific cue designation is recorded on the tape 52 (along with other data, such as the author's identification, point of initial dictation, the date, the time, and the end point of the message). In one particularly advantageous embodiment of the display module 22, each message type (or cue designation) may be selectively displayed (or alternatively highlighted) along the bottom edge of the display 24; and the cue designations are selected in sequence by successive pushing of the cue select button 102.

When tape 52 moves past the head 54, a cursor indicating the tape position, moves along the display 24 in the horizontal direction to show the tape position. The cursor may appear as a dark or light square positioned beneath the array of segments of the "letter" display graph on the display 24.

Information such as the author identification, the date and the present time can be entered by use of two pushbuttons 106 and 108 referred to, respectively, as the mode button and the select button on keyboard 26. If desired, these buttons may be concealed from view and from inadvertent operation. The mode and select buttons 106 and 108 are operatively connected via the line 104 to the microprocessor 78 for entering and storing the foregoing information. Such information can be entered conveniently by pressing the mode button 106 successively for selecting author identification, the date, and the form of time (12 hour or 24 hour clock) to be entered. The select button 108 is pressed to cycle through the numerals of the author identification, the time and date.

Further details of the circuitry of FIG. 4 will now be described with reference to FIGS. 5-7 followed by the flow charts of FIGS. 8-10.

Figure 5:
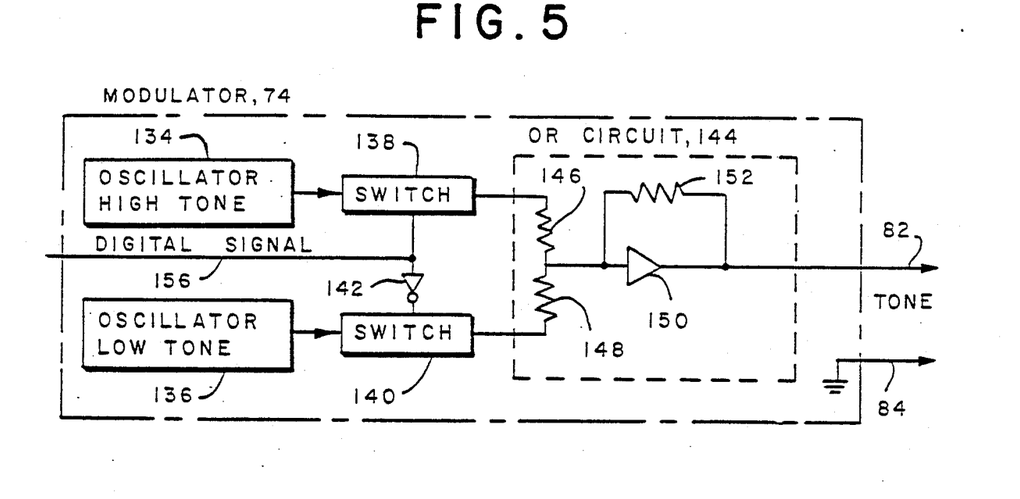
FIG. 5 shows one embodiment of a tone modulator that may be used in the display module of the present invention.

With reference to FIG. 5, the tone modulator 74 comprises two oscillators 134 and 136, two switches 138 and 140, a digital inverter 142 and an OR circuit 144. The OR circuit 144 comprises two summing resistors 146 and 148, and an amplifier 150 with a feedback resistor 152. In operation, the oscillator 134 produces a higher frequency tone signal (e.g., 1800 Hz) and the oscillator 136 produces a lower frequency tone signal (e.g., 1000 Hz). These signals are coupled by the switches 138 and 140 to the OR circuit 144 to be outputted on the audio line 82 (FIG. 4) as FSK (frequency shift keying) signals. A digital signal applied by the microprocessor 78 via line 156 to the switches 138 and 140 operates those switches to connect one or the other of oscillators 134 and 136 to OR circuit 144. The inverter 142 provides for alternate operation of the switches 138 and 140 such that a logic-1 signal on line 156 operates the switch 138 to output a high frequency tone on line 82, and a logic-0 signal on line 156 operates the switch 140 to output a low frequency tone on the line 82.

In the OR circuit 144, the summing resistors 146 and 148 couple signals respectively from the switches 138 and 140 to the negative input terminal of the amplifier 150. Thereby, the modulator 74 converts the digital signal on line 156 to audio tone FSK signals on line 82.

Figure 6:
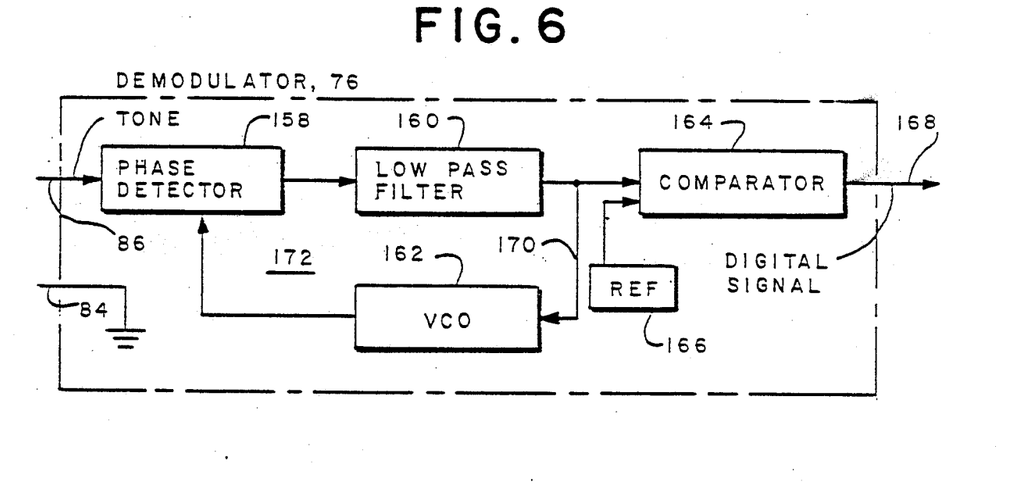
FIG. 6 shows one embodiment of a tone demodulator that may be used in the display module of the present invention.

FIG. 6 shows details of the tone demodulator 76, the demodulator comprising a phase detector 158, a low-pass filter 160, a voltage controlled oscillator 162, a comparator 164, and a source 166 of a reference signal for the comparator 164. The audio tone signal on line 86 (FIG. 4) is applied to an input terminal of the phase detector 158. The comparator 164 produces a digital signal which is applied via line 168 to the microprocessor 78 (FIG. 4).

In operation, the oscillator 162 oscillates at a frequency dependent on the amplitude of a signal outputted by the filter 160 via line 170 to the oscillator 162. The phase detector 158, the filter 160 and the oscillator 162 comprise a phase-locked loop 172, the operation of which loop is well known. The detector 158 outputs a signal to the filter 160 having an amplitude proportional to a difference in phase between the input signal on line 86 and an output signal of the oscillator 162. The filter 160 integrates the output signal of the detector 158 to provide a smoothly varying signal on line 170 for driving the oscillator 162. The bandwidth of the filter 160 is set in a well-known fashion to allow the loop 172 to follow the frequency of the audio tone line 86 as the tone frequency jumps between lower and higher frequencies. The higher tone frequency represents a logic-1 signal and the lower tone frequency represents a logic-0 signal for the transmission of display data.

It is noted that the frequency control signal on line 170 increases in amplitude to provide the higher output frequency of the oscillator 162, and decreases in amplitude to provide the lower output frequency of the oscillator 162. The signal on line 170 is applied to one input terminal of the comparator 164, a reference signal from the source 166 being applied to a second input terminal of the comparator. The magnitude of the reference signal lies between the two amplitude values of the signal on line 170. The comparator 164 outputs a logic-1 signal in response to a high output voltage on line 170, and outputs a logic-0 signal on line 168 in response to a low output voltage of the signal on 170. Thereby, the demodulator 76 converts the audio tone FSK signals on line 86 to digital signals on line 168. A digital transmission rate of, for example, 545 baud is employed in the preferred embodiment of the invention.

Figure 7:
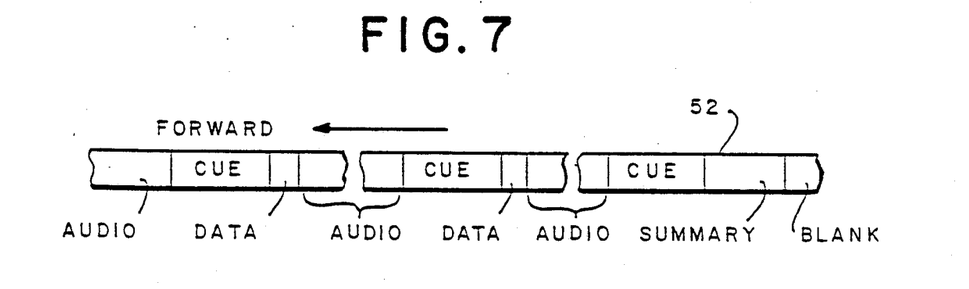
FIG. 7 shows an arrangement of regions of recorded audio signals and recorded display data signals on a recording tape.
Figure 8:
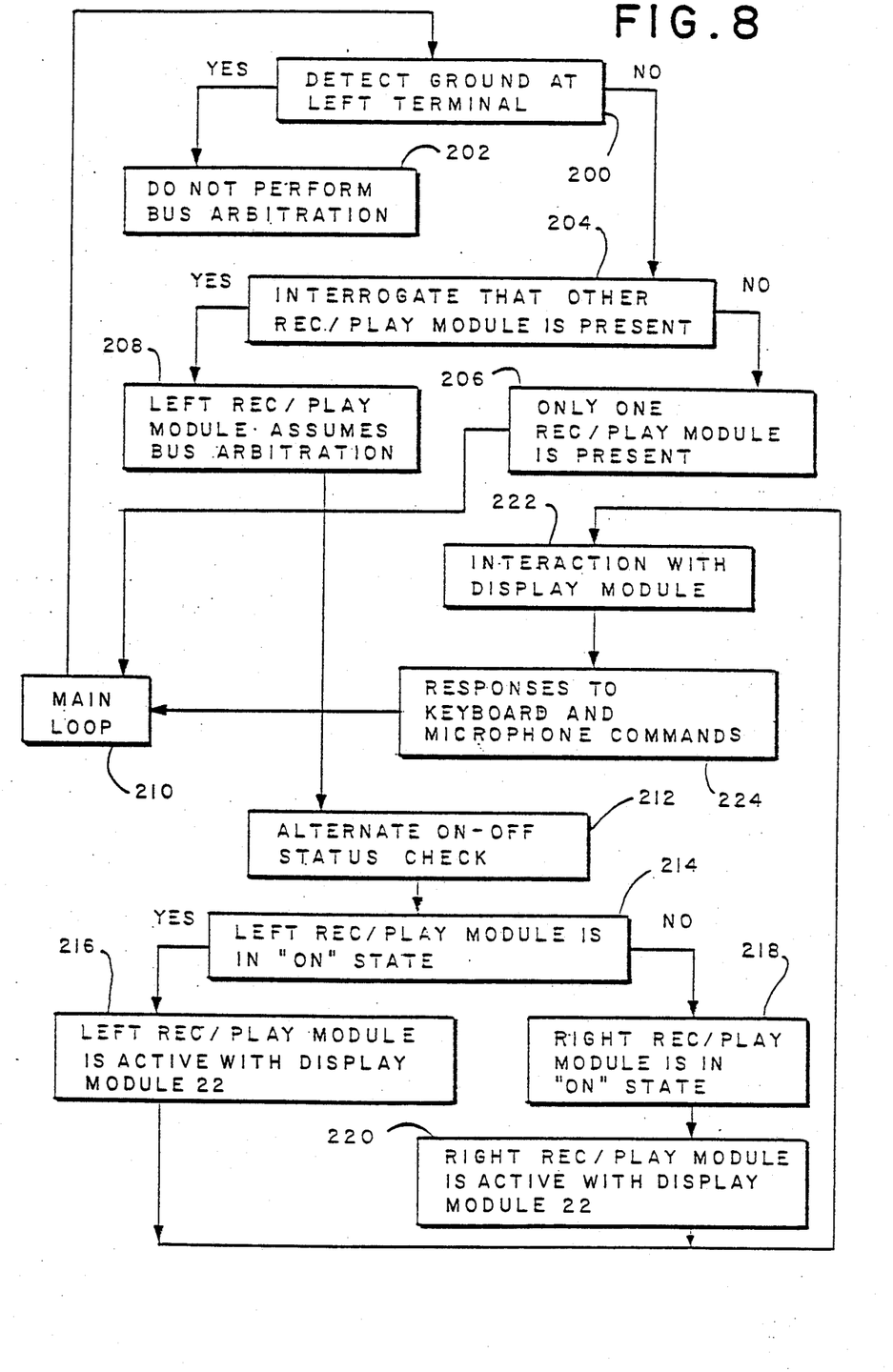
FIG. 8 is a flow chart representing a relevant portion of the operation of the microprocessor included in one recording/playback module that is connected to another recording/playback module and to the display module.

FIG. 7 shows diagrammatically a section of the recording tape 52. Portions of the tape carry recorded audio signals, while other portions of the tape carry recorded display data for operation of the display 24 of the display module 22. While an audio portion of the tape 52 may be relatively long, extending possibly through almost the entire length of the tape, the display data portion is relatively short.

The forward direction of tape movement in FIG. 7 is toward the left. It is seen that the display data is recorded in a "cue block" after the corresponding audio portion so as to include information as to the length of that audio portion. The operator signifies his conclusion of the dictation of a message (e.g., end of letter) by operating a cue button to record a cue signal, which signal is recorded as a 15 Hz signal (for example) on a region of the tape between the end of the audio passage and the beginning of the corresponding cue block display data portion.

During fast-forward and fast-reverse movement of the tape 52, the 15 Hz cue signal appears as a much higher frequency (in the range of 150–450 Hz) due to the rapid motion of the tape. Nevertheless, the length of the recorded portion of the cue signal is sufficient to allow the record/playback module 10 to detect the cue signal during fast-forward and fast-reverse movement so as to enable the drive 46 to stop the tape.

As shown in FIG. 7, a summary region is recorded in a summary data block at the end of the portion of the tape 52 containing recorded information. The summary data block contains data summarizing all of the display data recorded in the previous data regions and, as has been noted hereinabove, contains sufficient information to recreate the complete presentation of the recorded messages on the display 24 of the display module 22. The display data of the cue block data regions and the display data of the summary data block region are provided by the display module 22, as noted above, upon an indication by the operator that he has completed dictation of a message and that he is finished with the cassette, respectively. These operator indications are provided by use of the cue button on the microphone 12 and by use of the finish button on the keyboard 18.

As an example in the use of the display module 22 for presenting information useful in the transcription of material from a previously recorded tape cassette, a transcriptionist may command the display module 22 to present the above-described bar graph display of the previously recorded messages as follows: After insertion of a previously recorded cassette, the operator pushes the "display" button 72B on the keyboard 26 of the display module 22 to activate the microprocessor 78 to read the information provided in the summary data block of the tape 52 for presenting the information on the display 24. The tape 52 is then scanned in either forward or rewind directions, depending upon whether FORWARD SEARCH button 110 or REWIND SEARCH pushbutton 112 is actuated, to read the stored information from the cue blocks of tape 52 into the microprocessor 78. When the "display" pushbutton is actuated and the summary data block is read first, the entire display can be presented immediately, otherwise the display is generated piecemeal as the display data of each cue block is read. The operator selects the scan direction for accessing the summary data block by, for example, a "press-release" operation of pushbutton 72B to establish the rewind direction, or a "press-hold" operation to establish the forward direction. During the scanning, the finish cue signal preceding the summary data block or end of message cue signal preceding each cue block is detected by a detector 178 (FIG. 4), the detector 178 outputting a control signal via the interface unit 66 to the microprocessor 64.

During rewind scan, the microprocessor 64 responds by directing the drive 46 to stop the tape when a 15 Hz cue signal is detected, after which the tape is played in the forward direction. This brings the summary region, or data block, or a data region, referred to as a cue block, past the head 54 for communication via the audio link to the tone demodulator 76 and to the microprocessor 78. During forward scan, the tape is advanced in the fast forward mode and is brought to a halt in response to the detection of a recorded cue signal. In view of the fact that the tape may overshoot the cue signal position and, consequently, miss a part or all of the following display data portion, the microprocessor 64 is programmed to automatically command a back-up of the tape transport by a preset amount which brings the head 54 behind the display data portion. Thereupon, the tape advances in the forward direction and the display data is played back to be outputted to the microprocessor 78 of the display module 22. Thereafter, the microprocessor 78 commands the transport to advance further in the forward direction to accumulate data of other ones of the cue blocks of the tape 52, and finally to accumulate all of the display data in the summary data block. In this way, information relating to the messages recorded on a tape cassette is presented to the modules 10 (and 30) and 22.

The tape motion pulses generated by reel rotation detector 60 are employed by the microprocessor 78 for positioning the segments of the bar graph presentation. The nonlinear relationship between reel rotation and tape advance may be converted to a linear relationship by microprocessor 78 which employs a linearization procedure of the type described in U.S. Pat. No. 4,410,923, assigned to the assignee of the present invention, resulting in a substantially linear presentation on the display 24. The tape motion pulses are transmitted over the bus 88 under control of the microprocessor 64.

It will be appreciated that, although modules 10 and 30 both are connected electrically and physically only one of these recording/playback modules can communicate with the display module at any given time. Arbitration and determination of the proper module for such communication is described in copending U.S. application Ser. No. 895,006, Filed: Aug. 9, 1986 and titled: MODULAR DICTATION./TRANSCRIPTION SYSTEM (DIC-527), assigned to the assignee of the present invention.

Display data from both of modules 10 and 30 is stored in memory 80 of microprocessor 78. However, display 24 displays the data derived from only one of the recording/playback modules at any one time. The selection of which recording/playback has its data displayed is based upon which of modules 10 or 30 is actively engaged in either dictation or transcription. An operational status signal indication thereof is transmitted from module 10 or from module 30 to microprocessor 78.

In the construction of modules 10 and 30, it is advantageous to connect line 174 from microphone 12 to a further set of audio lines (not shown) connected between modules 10 and 30 to allow operation of the microphone 12 interaction of recording/playback modules 10 and 30 and display module 22. Initially, it is determined if plural recording/playback modules are present and, if so, the particular module whose microprocessor controls bus arbitration is designated. Typically, of two side-by-side modules, the module positioned on the left contains the microprocessor that controls bus arbitration. In such side-by-side connection, the module on the right is provided with a terminal that is coupled to ground via the module on the right. This terminal is the left terminal (L). Thus, if ground is not detected at the left terminal of a recording/playback module, the microprocessor therein performs bus arbitration either because that module is the only recording/playback module present or because that module is positioned on the left and, thus, is assigned this task.

The detection of ground at the left terminal is indicated in block 200 and, if ground is sensed, this module does not perform bus arbitration, as indicated at block 202. If ground is not detected, the operation of microprocessor 64 proceeds to block 204 in which the microprocessor interrogates the microprocessor of the presumably present other recording/playback module to determine whether or not that module is actually present. If no response is received, as shown at block 206, then only one recording/playback module, that is, module 10, is present, and the microprocessor advances to its main loop 210. The operation of a single recording/playback module with display module 22 is explained below in conjunction with FIGS. 9 and 10. While display module 22 is capable of operating with only one recording/playback module, the present invention is directed to the use of display module 22 with both recording/playback modules 10 and 30.

If both modules 10 and 30 are present, as indicated at block 204, the left recording/playback module (module 10) assumes the task of arbitration of the digital bus for control of communication among the modules of FIG. 4. This is represented by block 208.

If the active and inactive states of recording/playback modules 10 and 30 are referred to as "ON" and "OFF" states, respectively, and if keyboard 18 and 36 of each recording/playback module includes an ON/OFF button (or switch) to establish those states, the microprocessors in these modules interrogate each other to determine the status of one and to control the status of the other. This checking of the ON/OFF status is indicated at block 212. As a result of the status check, one or the other of recording/playback modules 10 and 30 is disposed in the ON state while the other is disposed in the OFF state as shown in blocks 214 and 218. If the ON/OFF switch of left module 10 is operated to establish the ON or active state for that module, module 10 signals display module 22 to display data of the recording activity of module 10, as shown in block 216. Alternatively, if the ON/OFF switch of right module 30 is operated to establish the ON or active state for that module (block 218), module 30 signals display module 22 to display data of the recording activity of module 30, as shown in block 220.

After display module 22 has received signals from whichever one of modules 10 and 30 is ON, the operation of microprocessor 64 proceeds to block 222 for interaction between display module 22 and the active recording/playback module. This interaction is explained in detail in conjunction with FIGS. 9 and 10. Thereafter, the program carried out by microprocessor 64 advances to block 224, whereby the recording/playback module responds to commands entered via the switches and keys of keyboard 18 and microphone 12 (FIG. 4), and then to main loop 210.

Thus, it is seen that display module 22 interacts with a selected one of recording/playback modules 10 and 30 for displaying data relating to the recording activity of that module. This interaction will now be explained in further detail with reference to FIG. 9, which is a flow chart representing the operation of microprocessor 64 of modules 10 or 30 as it interacts with display module 22.

Figure 9A:
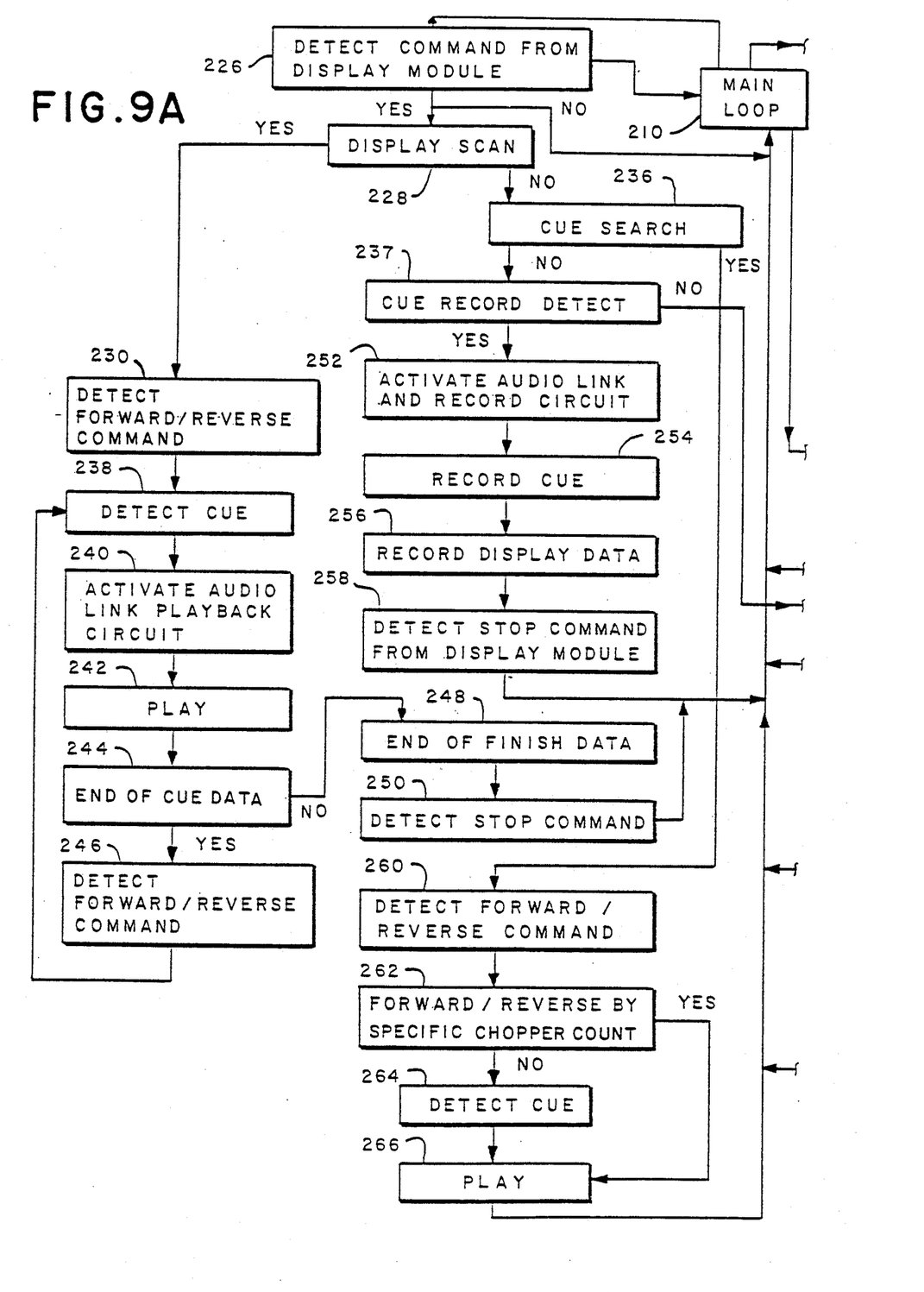
FIG. 9a & b is a flow chart representing the relevant operation of the microprocessor included in the recording/playback module to record and detect display data in accordance with the present invention.
Figure 9B:
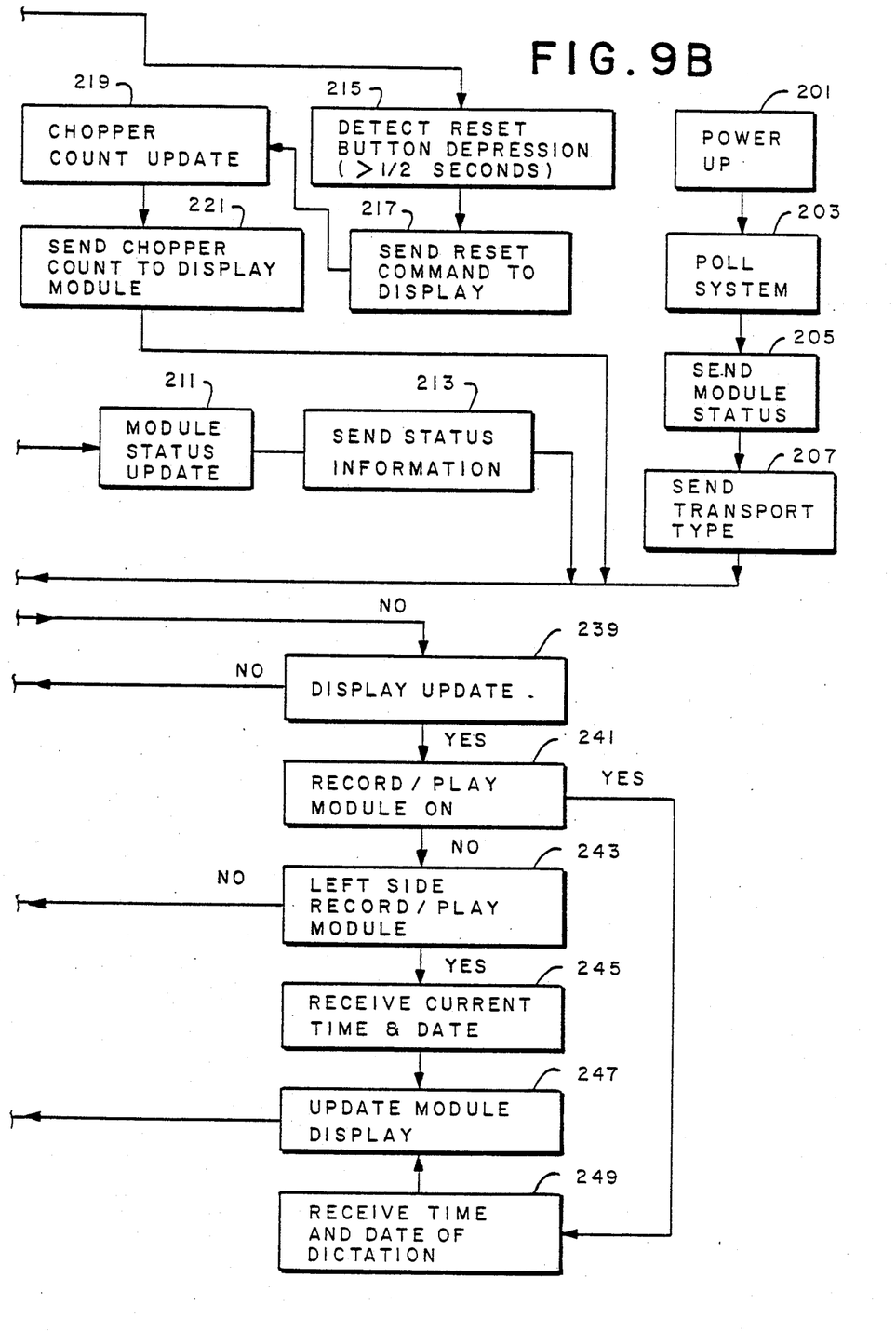

Turning now to FIG. 9, the flow chart illustrated therein begins with a "power up" routine 201 which is initiated when power first is supplied to the recording/playback module, as when the module first is plugged in to a suitable power source. The power up routine also may be carried out after recovering from a power failure, or when the ON switch of keyboard 18 (or keyboard 36) first is actuated. It will be appreciated by those of ordinary skill in the art that the power up routine serves to initialize and preset various parameters of the microprocessor.

Following the power up routine, the microprocessor advances to poll the system comprised of recording/playback module 10, display module 22 and, if present, recording/playback module 30, as indicated by instruction 203. This system polling is described more particularly in copending application Ser. No. 895,006, Filed: Aug. 8, 1986, Titled: MODULAR DICTATION/TRANSCRIPTION SYSTEM (DIC-527).

After the system is polled, the status of recording/playback module 10 is transmitted to the microprocessor included in display module 22, as represented by instruction 205. For example, the ON/OFF status of module 10 as well as an indication of whether this module comprises the left or right recording/playback module is transmitted to the display module. Then, as represented by instruction 207, the particular type of tape transport that is included in the recording/playback module is transmitted to the display module. Accordingly, the display module is apprised of whether the recording/playback module includes a tape transport that is compatible with standard cassettes, minicassettes, microcassettes or picocassettes. Also, if the tape transport may be operated at different record or playback speeds, an indication of the speed setting also is transmitted from the recording/playback module to display module 22. As a result, the proper number of segments included in the bar graph display of display module 22 for each, for example, minute of dictation may be energized. For example, one segment for each 30-second interval of dictation or one segment for each 60-second interval of dictation may be energized, depending upon the particular tape transport included in, and the recording or playback speed of, the recording/playback module.

After the power up routine and the system polling have been carried out, and after the recording/playback module status and transport type information have been transmitted to the display module, microprocessor 64 enters main loop 210. Instructions 201, 203, 205 and 207 may be out only when power first is applied or re-applied to the recording/playback module, as aforementioned.

Periodically, while executing the routines included in main loop 210, microprocessor 64 carries out an update routine, represented by instructions 211, 213, 215, 217, 219 and 221 of FIG. 9. Although the order in which the respective update instructions are carried out may be varied, as desired, for the purpose of the present description it will be assumed that the order is as indicated in this flow chart. With this assumed order of instructions, the microprocessor updates the status of the recording/playback module, as represented by instruction 211, and then sends this updated status information to display module 22, as represented by instruction 213. Thus, if the operating status of the recording/playback module changes over from "on" to "off", or from "record" to "play", etc., the display module is apprised of this changed status. Of course, if no change in the operating status occurs, the display module merely is provided with an indication of the same status as before.

After updated status information is transmitted to the display module, microprocessor 64 detects if the RESET button provided on keyboard 18 has been depressed for more than a predetermined period of time (e.g., for a duration greater than one-half second), as represented by instruction 215. Such a prolonged depression of the RESET button is interpreted by display module 22 is a command to reset display 24 to an initial setting. If this prolonged depression of the RESET button is detected at instruction 215, a reset command is transmitted to display module 22, as represented by instruction 217.

It is recognized that, as tape is transported, a so-called "chopper wheel", which may be mechanically coupled to the supply or take-up reel drive spindle, generates pulses. Such pulses are counted by a suitable counter (or equivalent) included in the recording/playback module, and this chopper pulse count is updated, as represented by instruction 219. The updated chopper pulse count is transmitted to display module 22, as represented by instruction 221. Thus, the display module is provided with information representing the present position of the magnetic tape that is processed in the recording/playback module.

After the instructions included in the update routine are carried out, the microprocessor returns to its main loop 210.

Periodically, the microprocessor of the active recording/playback module 10 or 30 proceeds from main loop 210 to block 226 which begins the interaction between the display module 22 and that active recording/playback module. The determination of which of modules 10 or 30 is active has already been determined by the operational procedures set forth in FIG. 8 at blocks 214, 216, 218 and 220. To simplify the following discussion, it will be assumed that module 10 is ON and module 30 is OFF. It will be understood that the same explanation applies if the active/inactive states of these modules is reversed.

Block 226 (FIG. 9) begins the interaction between the display module 22 and the recording/playback module 10, and represents that microprocessor 64 of the module 10 looks for a command from the display module 22. If no command is received, the operation reverts to the main loop 210. If a received command indicates a display scan operation is to be carried out (block 228), the operation shown in FIG. 9 continues to block 230 wherein the module 10 detects whether cue signal scanning is to be accomplished in the forward or reverse (rewind) direction of movement of the recording tape 52, depending upon the operation of the "display" pushbutton. If the command received from the display module indicates that the display scan operation is not to be carried out, the microprocessor proceeds from block 228 to block 236 to determine if a cue search operation should be performed, wherein the module 10 operates its tape transport to search the recording tape 52 for an end-of-message cue signal.

At block 230, the module 10 searches tape 52 in the selected forward or rewind direction for a cue signal, depending upon the direction indicated from the display module (e.g., as determined by the operation of the "display" pushbutton, as aforementioned). When a cue signal is detected (block 238) the tape drive 46 stops the movement of the tape 52, and the audio link is activated by operation of the switches 90 and 92 (block 240) for coupling signals played back from the cue block on tape 52 to the display module 22. The tape transport is operated to playback display data (block 242) from the cue block of the tape 52. Playback continues until the end of the cue data (block 244). Module 10 then again receives a forward/reverse command (block 246) and activates the tape transport to search for the next cue signal, such as the next cue block. The cycle is repeated upon return to block 238 wherein the module 10 attempts to find the next cue block of the tape 52.

With reference again to block 244, it may turn out that the detected cue data is included not in a cue block but in a summary data block. Playback of summary data block continues, similar to the playback of a cue block, until the end of the summary data block is detected (at 248). Thereupon, the module 10 detects a stop command (block 250) indicating the end of the summary data block, at which point the tape drive 46 is stopped and operation reverts to the main loop at block 210.

If the command from the display module indicates that neither a display scan nor a cue search operation is to be carried out, the received command may be indicative of a cue record operation. Upon detection of a cue record operation (block 237), module 10 implements the procedure for the recording of end of message display data or summary display data previously accumulated within the memory 80 of the display module 22. This data includes the locations of the start point of the first message (usually the beginning of tape) and the end points of each message dictated on the tape, as well as message characterizing signals (such as a letter, "priority" letter, an "instruction" or a "special" note, all of which are displayed by respective, distinctive displays). Also included are the identification of the author, the date, and the time of recording. The procedure of recording a cue block or a summary data block is implemented by activating the audio link 82 and record circuit 56 (of FIG. 4) at block 252. The sequence of recorded information begins with the recording of the cue signal (block 254), followed by the recording of the display data (block 256). The recording process stops upon detecting a stop command (block 258) from the display module 22, indicating that all of the display data has been read from memory 80. Thereafter, the operation reverts to the main loop 210.

With reference to block 236, if the command received from the display module 22 indicates that a cue search operation is to be performed to find a cue data field (e.g., letter, "priority" letter, instruction, "special" note), a forward or reverse tape movement command (e.g., a forward search or a rewind search command) is detected in block 260. Thereafter, at block 262, the module 10 may be provided with a command to advance by or to a specific chopper count. If no such command is given, the transport continues to advance the tape in either the forward or reverse direction until a cue signal is detected at block 264. Thereupon, playback of the cue data field (typically, the cue block) commences as indicated at block 266. If, at block 262, a specific chopper count is designated, the drive 46 moves the tape 52 by either fast forward or fast rewind by or to the designated count, after which playback (block 266) commences.

If the command received from display module 22 is not indicative of a display scan (block 228) or a cue search (block 236) or a cue record (block 237) operation, the microprocessor advances to block 239 to provide information to the display module by which the displayed data is updated. However, if the received command is not indicative of a display update operation, the microprocessor reverts from block 239 to main loop 210.

Assuming that the display update operation is to be carried out, the illustrated routine advances to block 241 to determine if the recording/playback module is "on", or in its active condition. If so, the time and date at which the latest message was dictated is received (block 249), and this time and date of dictation information is supplied to display module 22 to update the display information therein (block 247).

However, if this recording/playback module is "off" or inactive, the microprocessor advances to block 243 to determine if this module is the left recording/playback module. If not, the routine reverts to the main loop. But, if this recording/playback module is the left module, data representing the present time and date is received (block 245), and this present time and date information is supplied to the display module to update the display information therein (block 247).

Thus, if the recording/playback module is "on", the display module is provided with information representing the time and date of the latest dictated message. But, if the recording/playback module is not "on" but happens to be the left module, then it supplies the display module with present time and date information. It is appreciated, therefore, that time and date of dictation information is supplied from whichever recording/playback module happens to be "on", and present time and date information is supplied only from the left recording/playback module.

During the interaction between the recording/playback module 10 and the display module 22, both the microprocessor 64 of the module 10 and the microprocessor 78 of the display module 22 operate to provide the functions of data storage and display. The operation of the microprocessor 64, during this interaction, has been described in the flow chart of FIG. 9. The operation of the microprocessor 78, during this interaction, will now be described in conjunction with FIG. 10.

Figure 10:
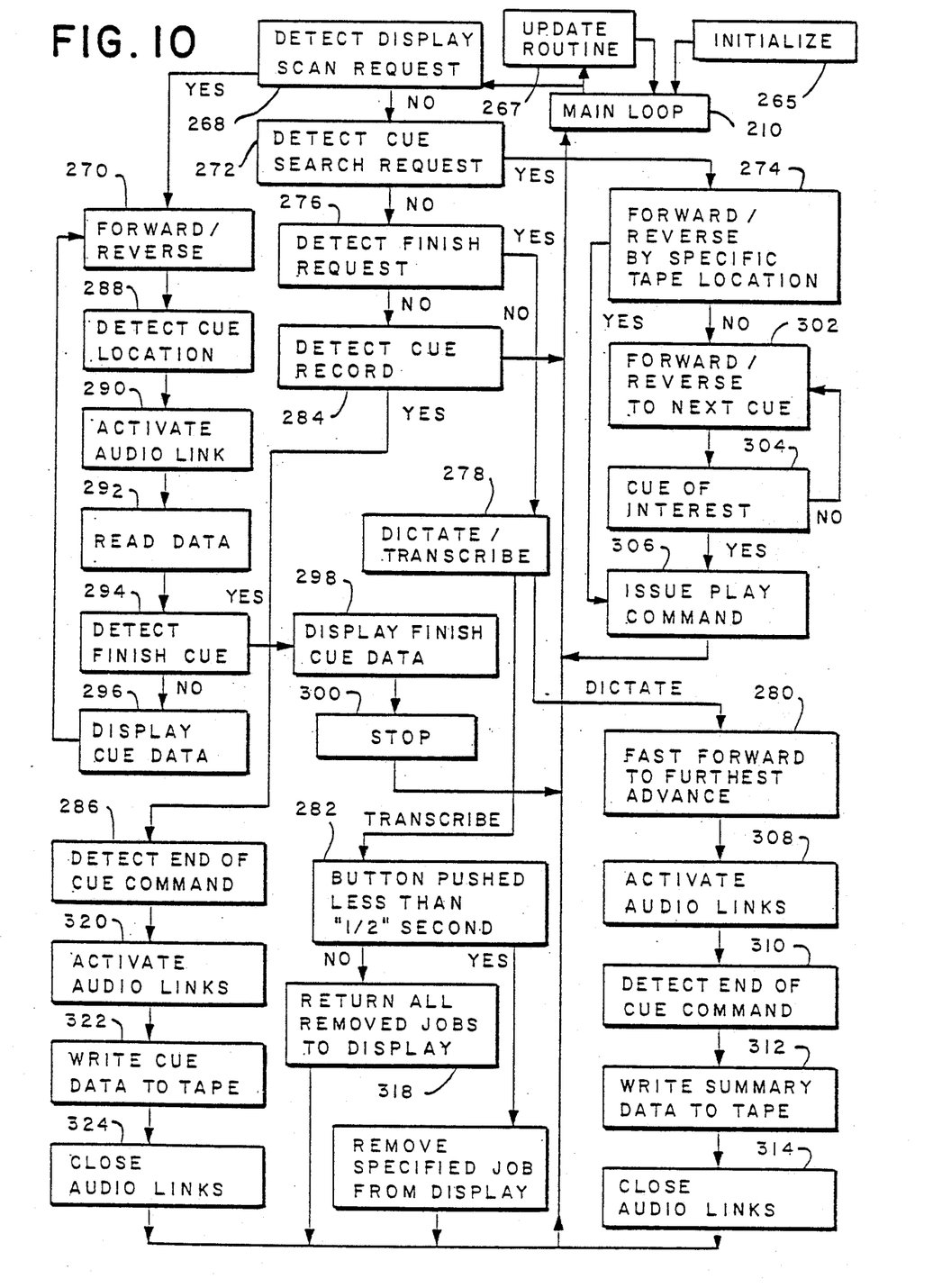
FIG. 10 is a flow chart of the relevant operation of the microprocessor included in the display module for controlling the operation of and interaction with the recording/playback module.

As shown in FIG. 10, the microprocessor 78 carries out an initialize subroutine 265 similar to the subroutine represented by blocks 201, 203, 205, and 207 of FIG. 9. The difference, however, between initialize subroutine 265 and what has been described above is that the status and transport type information provided by the recording/playback modules 10 and 30 is received by microprocessor 78 of display module 22. The initialize subroutine is carried out when power initially is supplied or re-supplied to the display module.

Microprocessor 78 periodically carries out an update subroutine similar to the update subroutine carried out by microprocessor 64 and represented by blocks 211, 213, 215, 217, 219 and 221 of FIG. 9. Here, however, rather than send updated information, microprocessor 78 receives the status, reset and chopper count data that is sent from microprocessor 64.

From main loop 210, the microprocessor of display module 22 advances to the detection of a display scan request at block 268, which request is initiated by an operator pushing the button 72B of display module 22. Detection is achieved after completion of the procedure of the main loop (which is similar to the main loop of microprocessor 64). If the display scan request is detected, the operation proceeds to block 270 to supply either a forward tape drive command or a reverse command to module 10, depending upon the operation of pushbutton 72B, as mentioned above. In the event that no request for a display scan is detected, the operation proceeds to block 272 for detection of a search request. Such request is made by pushing the Forward Search 110 or Rewind Search 112 buttons. The cue select button 102 of the display module 22 is used in conjunction with the FORWARD SEARCH or the REWIND SEARCH buttons to access, for example, the next "priority" letter, or the next instruction, or the next "special" note. In the event that such request is received, the operation proceeds to block 274 to sense whether the search is to proceed by forward or reverse movement of the recording tape 52, depending upon the selection by the operator of a forward or reverse search request, as mentioned above. In the event that no request for cue search is detected at block 272, the operation proceeds to block 276 wherein the display module 22 attempts to detect if pushbutton 72A has been operated to initiate a finish request. If a finish request has been detected, the operation proceeds to block 278 to sense if module 10 is in its dictate or transcribe mode. If the former, operation continues to block 280 and if the latter to block 282. In the event that no finish request is detected at block 276, the operation proceeds to block 284 for the detection of a cue signal record command, generated by the operation of the cue pushbuttons on microphone 12. If such a cue record command is detected from the module 10, the operation of the module 22 proceeds to block 286 to detect an end-of-cue command. In the event that a cue signal is not to be recorded, the microprocessor returns from block 284 to the main loop 210.

With reference to the block 270, in response to a display scan request, microprocessor 78 commands microprocessor 64 to advance the recording tape 52 for detection of a cue region at block 288. Thereupon, at block 290, the audio link is activated by switches 92 and 90 to couple data between the tape 52 and the display module 22. The reading of data is indicated at block 292, which reading continues until the detection of a finish cue at block 294. If no finish cue is detected, the data read out of the sensed cue block recorded on the tape 52 is displayed at block 296, after which the operation reverts to block 270 for continued advancement of the recording tape to the next cue position. If, at block 294, a finish cue is detected, the summary display data is displayed as indicated at block 298, and the data reading process stops at block 300 whereupon the operation reverts to the main loop at block 210. It will be appreciated that the display is as follows: the length of a letter or "priority" letter is indicated by the number of successive segments energized in display 24, and a letter is represented by steady state energized segments whereas a "priority" letter is represented by flashing segments. An instruction is indicated by energizing the particular segment in a separate array to represent the location of that instruction. A "special" note is indicated in a manner similar to that for an instruction, but the segment is flashed.

With reference to the blocks 272 and 274, in the event that there is a request to search for a cue, but a specified tape location for a cue has not been requested, the operation advances to block 302 in which the recording tape is advanced in the forward or reverse direction, as requested by the operator, to reach the next cue block. If this cue is not the selected cue of interest (block 304), that is, a letter, "priority" letter, instruction or "special" note has been selected but the cue which is reached does not represent the selected cue, then the operation reverts to block 302 for advancement to the next cue. If, at block 304, the detected cue is the cue of interest, then the operation advances to block 306 wherein the display module 22 commands the module 10 to playback the tape 52 for reproducing the message. Alternatively, if at block 274, a specific tape location has been requested, then the tape drive 46 is directed by microprocessor 64 under command from microprocessor 78 to move the tape 52 by fast forward or fast rewind (as selected) to bring the tape to the designated location at which, at block 306, the tape is played back for reproduction of the recorded information. Thereupon, the operation reverts to the main loop at block 210.

With reference to blocks 276 and 278, upon detection of a finish request during dictation, microprocessor 78 commands microprocessor 64 to terminate the dictation process and advance the tape by fast forward (block 280) to the furthest advance point of dictated material. A cue signal is recorded; and thereupon, at block 308, the audio link is activated followed by detection of the end-of-cue command at block 310. This provides the site on the tape wherein the summary data is to be written. At block 312 the summary display data describing usage of the recording tape, which data had been stored in the memory 80, is coupled via the audio link for recording on the tape 52. Upon completion of the recording of the summary data block, the audio links are closed (block 314) after which the operation reverts to the main loop 210.

In the event that the finish request (block 276) is detected during a transcribe operation, the display 24 extinguishes the set of display segments representing the message which has just been transcribed or, alternatively, if those segments and others had been extinguished, the finish request re-energizes those segments. The extinguished segments leave a space in the bar graph display which indicates to the transcriptionist those messages that have been transcribed. Block 282 determines if the finish button 72A is pushed for less than one-half second, which then extinguishes the segments that define a particular message, or if the finish button is pushed and held for more than one-half second to re-energize all of the segments which had previously been extinguished. Thereafter, operation reverts to the main loop 210.

With reference to blocks 284 and 286 for the detection of a cue record command during a dictate operation, the end of the cue record command is detected at block 286 followed by activation of the audio links at block 320. Thereafter, the display data associated with the completed message, such as the end point of the message, are supplied from microprocessor 78 to module 10 for recording in the cue block of the tape 52, as indicated at block 322. At the conclusion of the recording of the display data, the audio links are closed at block 324, and the operation reverts to the main loop 210.

From the foregoing description, it is seen that the invention enables a single display device to be used with a plurality of recording/playback devices while presenting additional functions which increase the utility, flexibility and efficiency of the dictation/transcription process.

It is to be understood that the above-described embodiment of the invention is illustrative only and that modifications thereof may occur to those skilled in the art. Accordingly, this invention is not to be regarded as being limited to the embodiment disclosed herein, but is to be limited only as defined by the appended claims.

What is claimed is:

1. A dictation/transcription system for recording and playing back audio messages, comprising:
   at least two independently operable recording units each having means for recording messages on a recording medium contained therein;
   means associated with each recording unit for generating data relating both to the stored messages and to the dictation/transcription activity of that recording means such as data representing the types of messages, the locations of those messages on the recording medium and the lengths of those messages; and
   a common display unit operatively coupled to and supplied with the data generated in two of said recording units and operable in one mode to display the generated data relating to one of said recording units and operable in another mode to display the generated data relating to the other of said recording units.

2. The system of claim 1 wherein each said recording unit is selectively disposed in an active mode for recording or playing back a message and in an inactive mode, and wherein said display unit operates to display the generated data relating to the recording unit disposed in the active mode.

3. The system of claim 2, further comprising sense means for sensing which of said recording unit is disposed in said active mode, and means responsive to said sense means for operating said display unit in said one or another mode.

4. The system of claim 3 wherein said display unit includes storage means for storing the generated data relating to each recording unit, visual indicating means for providing visual indications in response to said generated data, and means for selectively supplying to said visual indicating means the stored generated data relating to the active recording unit.

5. The system of claim 4, further comprising means for sensing when the recording unit disposed in the inactive mode is changed over, to the active mode and for sensing when the recording, unit disposed in the active mode is changed over to the inactive mode.

6. The system of claim 5 wherein said display unit is electrically and physically connected to one of said recording units to form an integral structure therewith.

7. The system of claim 5 wherein said storage means includes respective storage sections for storing the generated data relating to respective ones of said recording units.

8. The system of claim 7 further comprising means for retaining the generated data in a storage section, without modification thereto, notwithstand recording unit to which that data relates is disposed the active mode.

9. The system of claim 7, further comprising means for switching the active mode between said two recording units.

10. The system of claim 1 wherein said data represents the type of messages which are stored.

11. The system of claim 10 wherein said data represents stored letters.

12. The system of claim 10 wherein said data represents stored "priority" letters.

13. The system of claim 10 wherein said data represents stored instructions.

14. The system of claim 10 wherein said data represents stored "special" notes.

15. The system of claim 1 wherein said data represents the following mutually different types of messages: letters, "priority" letters, instructions, and "special" notes.

16. The system of claim 15 wherein said display means includes means for providing a mutually distinctive visual indication of each type of message.

17. The system of claim 16 wherein said means for providing a mutually distinctive visual indication comprises an array of indicator segments, means for energizing successive indicator segments to represent the length of at least some of said types of messages, and means for deactivating selected indicator segments to represent the end of one message and the beginning of the next message.

18. The system of claim 17 wherein letters are displayed as substantially steady-state energized segments; and wherein "priority" letters are displayed as flashing segments.

19. The system of claim 17 wherein said means for providing a mutually distinctive visual indication further comprises a second array of indicator segments, means for steady-state energization of selected segments in said second array to represent the locations of stored instructions, and means for flashing energization of selected segments in said second array to represent the locations of stored "special" notes.

20. The system of claim 1 wherein said data further includes signals representing the locations in said recording medium whereat said messages are stored, the identity of at least one author of said audio messages, and the times at which said messages were stored.

21. A method of displaying information relating both to stored messages and to dictation/transcription activity of either one of two independently operable recording units having means for recording messages on a recording medium therein on which messages are stored and recovered, said method comprising the steps of: generating display data relating to the messages and activity of one recording unit, such as data representing the types of messages, the locations of those messages on the recording medium of said one recording unit and the lengths of those messages; generating display data relating to the messages and activity of the other recording unit, including data representing the types of messages, the locations of those messages on the recording medium of the other recording unit and the lengths of those messages; and providing on a common display unit a display of information derived from the display data of a selected one of the recording units.

22. The method of claim 21, further comprising the steps of sensing when respective ones of the recording units are active for recording or reproducing messages; sensing when respective ones of the recording units are otherwise inactive; and providing a display of information derived from the display data of only the active recording unit.

23. The method of claim 22 wherein only one recording unit is active at any given time.

24. The method of claim 23 further comprising the step of storing the display data of both recording units such that when an inactive recording unit becomes active its stored data is utilized to provide said display.

25. The method of claim 21 wherein said display data represents the following mutually different types of messages: letters, "priority" letters, instructions and "special" notes.

26. The method of claim 25 wherein each type of message is displayed as a mutually distinctive visual indication.

27. The method of claim 26 wherein letters are displayed as a series of successive, steady-state energized indicator segments and "priority" letters are displayed as a series of successive, flashing indicator segments; and wherein the end of a letter or "priority" letter is indicated by a de-energized segment.

28. The method of claim 27 wherein an instruction is represented by a steady-state energized indicator segment, and a "special" note is represented by a flashing indicator segment, the location of the steady-state or flashing indicator in an array of indicators being indicative of the location of the recorded instruction or "special" note.

29. A modular dictation/transcription system comprising a plurality of physically independent modules each being connectable to one another to form an integral structure, two of said modules comprising recording modules each including a recording medium on which messages are stored and each recording module having means for generating data relating to the stored messages therein; and another of said modules comprising a common display module supplied with the data generated by said two recording modules and operable in one mode during recording and playback of said record medium by one recording module to display the generated data relating to the messages stored in one recording module and operable in another mode during recording and playback of said record medium by the other recording module to display the generated data relating to the messages stored in the other recording module while storing the message related data generated by said one recording module.

30. A modular dictation/transcription system comprising:
   two record/playback units, each including a record medium for storing messages and means for generating during recording and detecting during playback data such as message type data representing the type of each recorded message, location data representing the location of each message stored on said record medium and length data representing the length of at least certain types of messages; and
   a display unit mechanically coupled to one of said record/playback units and electrically connected to both record/playback units, said display unit having communication means for receiving from each record/playback unit the message type data, location data and length data generated or detected thereby; storage means for storing the message type data, location data and length data generated or detected by each record/playback unit; and display means for displaying the data stored in said storage means and generated or detected by a selected one of said recording units.

* * * * *